US009060038B2

(12) United States Patent
Yale

(10) Patent No.: US 9,060,038 B2
(45) Date of Patent: Jun. 16, 2015

(54) DYNAMIC DOMAIN NAME SERVER CONSOLE FOR DISASTER RECOVERY SERVER MANAGEMENT

(75) Inventor: Norman Yale, Hoffman Estates, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 399 days.

(21) Appl. No.: 13/108,236

(22) Filed: May 16, 2011

(65) Prior Publication Data

US 2012/0297197 A1 Nov. 22, 2012

(51) Int. Cl.
*G06F 7/04* (2006.01)
*H04L 29/08* (2006.01)
*H04L 29/12* (2006.01)
*H04L 29/14* (2006.01)
*H04L 29/06* (2006.01)

(52) U.S. Cl.
CPC .............. *H04L 67/34* (2013.01); *H04L 63/083* (2013.01); *H04L 63/126* (2013.01); *H04L 61/1511* (2013.01); *H04L 61/2076* (2013.01); *H04L 69/40* (2013.01)

(58) Field of Classification Search
USPC ..................................................... 726/26–30
See application file for complete search history.

(56) References Cited

U.S. PATENT DOCUMENTS

| 7,069,452 B1* | 6/2006 | Hind et al. .................... 713/1 |
| 2002/0073335 A1* | 6/2002 | Shuster .......................... 713/201 |
| 2002/0087722 A1* | 7/2002 | Datta et al. .................... 709/239 |
| 2002/0099600 A1* | 7/2002 | Merriman et al. .............. 705/14 |
| 2005/0075983 A1* | 4/2005 | St.-Denis ......................... 705/64 |
| 2005/0203921 A1* | 9/2005 | Newman et al. .............. 707/100 |
| 2007/0124578 A1* | 5/2007 | Paya et al. ...................... 713/155 |
| 2008/0086556 A1* | 4/2008 | Ramalingam et al. ........ 709/224 |
| 2008/0263389 A1* | 10/2008 | Ku et al. ............................ 714/4 |
| 2010/0138686 A1* | 6/2010 | Arata et al. ....................... 714/4 |
| 2010/0281146 A1* | 11/2010 | Lee ................................ 709/221 |
| 2012/0117649 A1* | 5/2012 | Holloway et al. ............... 726/24 |
| 2012/0174196 A1* | 7/2012 | Bhogavilli et al. ................ 726/5 |
| 2013/0247183 A1* | 9/2013 | Kumar et al. .................... 726/22 |

OTHER PUBLICATIONS

Beck et al., "A Monitoring Approach for Safe IPv6 Renumbering," Computing in the Global Information Technology, 2006. ICCGI '06. International Multi-Conference on 2006 , p. 8.*
Jakab et al. "LISP-TREE: A DNS Hierarchy to Support the LISP Mapping System," Selected Areas in Communications, IEEE Journal on vol. 28 , Issue: 8 2010 , pp. 1332-1343.*

* cited by examiner

*Primary Examiner* — Christopher Brown
*Assistant Examiner* — Roderick Tolentino
(74) *Attorney, Agent, or Firm* — Hartman & Citrin LLC

(57) ABSTRACT

Methods, systems, and computer-readable media for updating a domain name server are provided. A console may receive a first request to access the console. The console may verify first permission to access the console. The console may receive a second request to access the domain name server. The console may verify second permission to access the domain name server. The console may receive an instruction to modify an entry in the domain name server. The instruction may specify that a previous Internet Protocol address in the entry is replaced with a new Internet Protocol address. The console may transmit the instruction from the console to the domain name server. The domain name server may be configured to replace the previous Internet Protocol address with a new Internet Protocol address in the entry in response to the instruction.

17 Claims, 3 Drawing Sheets

DYNAMIC DOMAIN NAME SERVER CONSOLE FOR DISASTER RECOVERY SERVER MANAGEMENT

BACKGROUND

This application relates generally to the field of disaster recovery. More specifically, the disclosure provided herein relates to dynamically updating a domain name server in a disaster recovery environment.

A typical disaster recovery configuration may include a first geographic location and a second geographic location. The first geographic location may include one or more server computers, including a first server computer having a first database. The second geographic location may also include one or more server computers, including a second server computer having a second database. The first database and the second database may be redundant databases that store the same information. While the first server computer may be active, the second server computer may be on standby. For example, when a remote end user requests access to the information, the first server computer may handle the request via the first database. When the information in the first database changes, the first server computer may propagate those changes to the second server computer, which updates the second database. In this way, the second database may serve as redundant storage for the information.

In an example disaster recovery scenario, the first server computer may fail. When the first server computer fails, the second server computer may take over handling requests to access the information. That is, the first server computer may become inactive, while the second server may become active. Thus, when the remote end user requests access to the information, the second server computer may handle the request via the second database.

The end user may request initially access to the first server computer via a first server location, such as an Internet Protocol ("IP") address or a domain name, associated with the first server computer. The end user may determine that the first server computer has failed when the first server computer does not respond after a certain amount of time. The end user may then request access to the second server computer via a second server location associated with the second server computer. In this scenario, the end user may be responsible for having knowledge of the first server location and the second server location. The end user may also be responsible for determining whether the first server computer has failed and manually transitioning to the second server computer when the first server computer fails. Placing such responsibilities on the end user can be frustrating, tedious, and time-consuming for the end user.

SUMMARY

Embodiments of the disclosure presented herein include methods, systems, and computer-readable media for updating a domain name server. According to one aspect, a method for updating a domain name server is provided. According to the method, a console may receive a first request to access the console. The console may be coupled to the domain name server. Upon receiving the first request to access the console, the console may verify first permission to access the console. Upon verifying the first permission to access the console, the console may receive a second request to access the domain name server. Upon receiving the second request to access the domain name server, the console may verify second permission to access the domain name server. The console may receive an instruction to modify an entry in the domain name server. The instruction may specify that a previous Internet Protocol address in the entry is replaced with a new Internet Protocol address. The console may transmit the instruction from the console to the domain name server. The domain name server may be configured to replace the previous Internet Protocol address with a new Internet Protocol address in the entry in response to the instruction.

According to another aspect, a console for updating a domain name server is provided. The console may be coupled to a domain name server. The console may include a memory and a processor functionally coupled to the memory. The memory may store a program containing code for updating the domain name server. The processor may be responsive to computer-executable instructions contained in the program and configured to perform the following operations. The console may receive a first request to access the console. Upon receiving the first request to access the console, the console may verify first permission to access the console. Upon verifying the first permission to access the console, the console may receive a second request to access the domain name server. Upon receiving the second request to access the domain name server, the console may verify second permission to access the domain name server. The console may receive an instruction to modify an entry in the domain name server. The instruction may specify that a previous Internet Protocol address in the entry is replaced with a new Internet Protocol address. The console may transmit the instruction from the console to the domain name server. The domain name server may be configured to replace the previous Internet Protocol address with a new Internet Protocol address in the entry in response to the instruction.

According to yet another aspect, a computer-readable medium having instructions stored thereon for execution by a processor to perform a method for updating a domain name server is provided. According to the method, a console may receive a first request to access the console. The console may be coupled to the domain name server. Upon receiving the first request to access the console, the console may verify first permission to access the console. Upon verifying the first permission to access the console, the console may receive a second request to access the domain name server. Upon receiving the second request to access the domain name server, the console may verify second permission to access the domain name server. The console may receive an instruction to modify an entry in the domain name server. The instruction may specify that a previous Internet Protocol address in the entry is replaced with a new Internet Protocol address. The console may transmit the instruction from the console to the domain name server. The domain name server may be configured to replace the previous Internet Protocol address with a new Internet Protocol address in the entry in response to the instruction.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
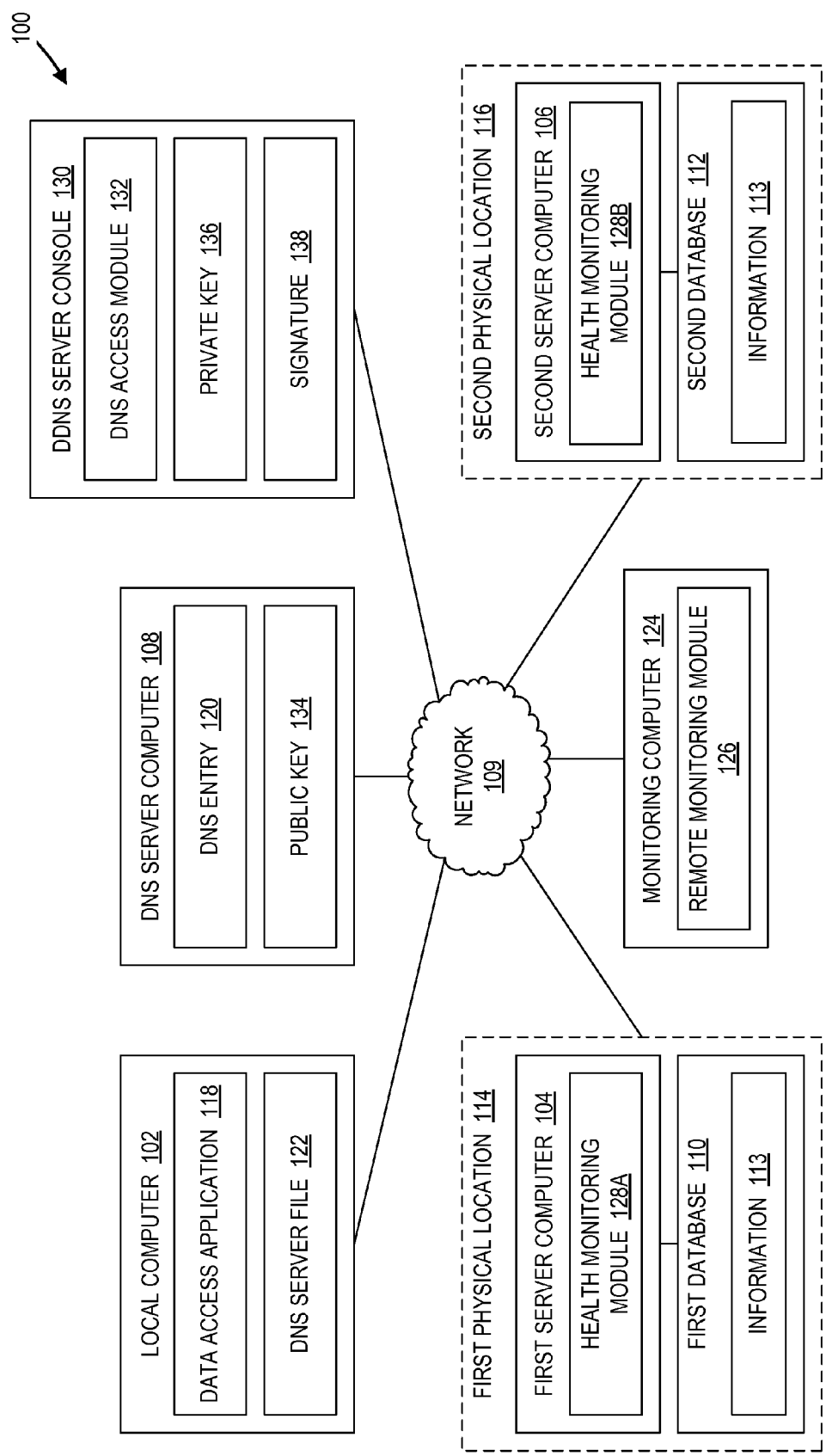
FIG. 1 is block diagram illustrating an example network architecture configured to dynamically update a domain name server, in accordance with some embodiments.

The following detailed description is directed to various technologies, including a dynamic domain naming server ("DDNS") server console, configured to dynamically update a domain name server ("DNS") server computer. The DDNS server console may be utilized during a disaster recovery event and other events where the DNS server computer needs to be remotely and dynamically updated. In an illustrative scenario, an end user may perform various tasks on a local computer. Some of these tasks may involve the user accessing remote server computers, such as a first server computer, via a network. The first server computer may be coupled to a first database, which contains information that can be accessed by the end user via the local computer. While the first server computer is an active server computer, a second server computer at a different physical location than the first server computer may be a standby server computer. The second server computer may be coupled to a second database, which mirrors the information stored in the first database. If the first server computer fails, then the second server computer may become active and take over requests for the information.

In order to access the first server computer, the end user may enter a first domain name associated with the first remote server into a data access application operating in the local server computer. The local server computer may store a DNS server file, which contains a location of the DNS server computer. The DNS server may contain multiple DNS entries, each of which contains a mapping between a different domain name and a corresponding IP address. The DNS server may contain a first DNS entry that maps the first domain name to a first IP address and a second DNS entry that maps the second domain name to a second IP address. The data access application may access the first DNS entry in the DNS server computer in order to retrieve the first IP address corresponding to the first domain name. Upon retrieving the first IP address corresponding to the first domain name, the data access application may direct the end user to the first server computer via the first IP address. However, in a disaster recovery event, the first server computer may not be accessible due to failure.

Conventionally, the end user may determine that the first server computer is down after the first server computer does not respond for a certain amount of time (e.g., after a timeout). The end user may then enter a second domain name associated with the second server computer into the data access application. The data access application may access the second DNS entry in the DNS server in order to retrieve a second IP address corresponding to the second domain name. The data access application may then direct the end user to the second server computer via the second IP address. In such conventional approaches, the end user may be required to retain knowledge of multiple IP addresses, including the first IP address and the second IP address. The end user may also be required to retain knowledge of the sequence at which server computers transition from standby to active. For example, in some implementations, only one server computer may be active at a given time. The end user may further be required to determine whether a server computer is operational by inputting domain names by trial-and-error. This trial-and-error process can be especially time consuming when multiple server computers fail.

To address the drawbacks of conventional approaches, various embodiments described herein provide a DDNS console configured to dynamically update a DNS server computer. The DDNS console may be coupled to the DNS server computer and adapted to update the DNS server computer in an automated or substantially automated manner when a server computer fails. For example, when the first server computer fails, the console may be utilized to update the first DNS entry such that the first domain name maps to the second IP address instead of the first IP address. In this way, when the first server computer fails, the data access application can retrieve the second IP address and properly direct the end user to the second server computer.

Technicians or other work-related staff may be assigned to monitor the health of server computers. When a technician discovers that a server computer is failing or is about to fail, the technician may access the DDNS server console and utilize the DDNS server console to update the relevant DNS entry for the server computer. In this way, the DDNS server console may relieve the end user of any responsibility to remember a separate domain name for each server computer, to remember the sequence at which server computers transition from standby to active, and/or to determine the health of the server computers. The actions of the technician and the operation of the console may be entirely transparent to the end user. That is, from the end user's perspective, the end user is merely accessing information at a single domain name without knowledge of the particular IP address or the particular active server computer.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, FIG. 1 is an example block diagram illustrating a network architecture 100 configured to dynamically update a DNS server computer, such as a DNS server computer 108, in accordance with some embodiments. The network architecture 100 may include a local computer 102, a first server computer 104, a second server computer 106, and a DNS server computer 108. The first server computer 104, the second server computer 106, and the DNS server computer 108 may be coupled via network 109. The first server computer 104 may be coupled to a first database 110. The second server computer 106 may be coupled to a second database 112.

The first server computer 104 and the first database 110 may be located at a first physical location 114. The second server computer 106 and the second database 112 may be located at a second physical location 116. For example, the first physical location 114 and the second physical location 116 may be located in different cities and/or different states. Although the FIG. 1 illustrates a single server computer at the first physical location 114 and the second physical location 116, it should be appreciated that each of the physical locations 114, 116 may include a cluster of server computers. One of the server computers in the cluster may be active while other computers in the cluster are on standby. When the active server computer fails, a standby server computer in the cluster may take over and become active. When the cluster of server computers fails (e.g., in a natural disaster), a standby server computer in another cluster of server computers may take over.

The local computer 102 may include a data access application 118. The DNS server may include multiple DNS entries, including a DNS entry 120. The first server computer 104 may be accessed via a first IP address, and the second server computer 106 may be accessed via a second IP address. The first database 110 and the second database 112 may store information 113. That is, the second database 112 may mirror the first database 110. The first server computer 104 may be active and accessible by an end user via the local computer 102. The second server computer 106 may be inactive and inaccessible via the local computer 102 while the first server computer 104 is active.

The end user may be given a domain name for accessing the information 113. For example, by accessing the information 113, the end user may be able to read the information 113 and/or write the information 113. The end user may enter the domain name into the data access application 118. For example, the domain name may be a fully qualified domain name. Upon receiving the domain name, the data access application 118 may access a file 122 on the local computer 102. The file 122 may contain a third IP address associated with the DNS server. The data access application 118 may retrieve the third IP address from the file 122 and access the DNS server computer 108 via the third IP address.

When the data access application 118 accesses the DNS server computer 108, the data access application 118 may retrieve an IP address associated with the domain name. In particular, the data access application 118 may retrieve the IP address from the DNS entry 120. The DNS entry 120 may map the domain name to an IP address of an active server computer. In a non-disaster recovery scenario, the DNS entry 120 may map the domain name to the first IP address, which corresponds to the first server computer 104. As a result, the data access application 118 may retrieve the first IP address from the DNS entry 120. Upon retrieving the first IP address from the DNS entry 120, the data access application 118 may direct the user to the first server computer 104 via the first IP address.

A technician or other work-related personnel may monitor the health of the first server computer 104. The technician may utilize a monitoring computer 124 coupled to the network 109. The monitoring computer 124 may include a remote monitoring module 126. The remote monitoring module 126 may receive monitoring data about the first server computer 104 from a health monitoring module 128A in the first server computer 104. In particular, the health monitoring module 128A may monitor various parameters associated with the health of the first server computer 104. The health monitoring module 128A may collect values associated with these parameters and periodically provide the values to the technicians via the remote monitoring module 126. Some examples of parameters may include response time, processor usage, memory usage, network usage, and other parameters related to the health of the first server computer 104.

Upon receiving the values from the health monitoring module 128A, the technician may determine whether the values indicate that the first server computer 104 is failing or is about to fail. If the technician determines that the first server computer 104 is failing or is about to fail, then the technician may access the DNS server computer 108 in order to update the DNS entry 120. In various embodiments, the technician may access the DNS server computer 108 via the monitoring computer 124 and a DDNS server console 130. The DDNS server console 130 may include a DNS access module 132. The DDNS server console 130 may be a UNIX, LINUX, or WINDOWS based server computer, according to various embodiments.

Through the DNS access module 132, the technician may access the DNS server computer 108. For example, the technician may utilize the DNS access module 132 to communicate with the DNS server computer 108 via Telnet or some other network protocol capable of establishing a connection between the DDNS server console 130 and the DNS server computer 108. When the technician initially connects to the DNS server computer 108, the DNS server computer 108 may authenticate the technician as having permission to access the DNS server computer 108. In some embodiments, the DNS server computer 108 may authenticate the technician via a username and password entered by the technician via the DNS access module 132.

When the DNS server computer 108 grants access to the technician, the technician may initiate an "nsupdate" command via the DNS access module 132. The "nsupdate" command may refer to a utility provided by the DNS server computer 108 through which the technician can modify the DNS entry 120. When the technician initiates the "nsupdate" command, the DNS server computer 108 may request further verification as to whether the technician has the proper permissions to perform the "nsupdate" command. For example, the DNS server computer 108 may require that the technician have a special level of access (e.g., root access, administrative access, etc.) in order to modify the DNS entry 120. The special level of access may require additional actions beyond verifying the technician's username and password.

In some embodiments, the DNS server computer 108 may verify that the technician has the proper permissions via a public key cryptography authentication scheme. In an example of a public key cryptography authentication scheme, the DNS server computer 108 may store a public key 134 and the DDNS server console 130 may store a private key 136. The public key 134 and the private key 136 may form a key pair. The public key 134 may be publicly known and not a secret, whereas the private key 136 may be a secret and known only to operators of the DDNS server console 130. When the DNS access module 132 requests access to the DNS server computer 108, the DNS access module 132 may also generate a signature 138 using the private key 136. The DNS access module 132 may then provide the signature 138 to the DNS server computer 108. The DNS server computer 108 may verify that the signature 138 is genuine using the public key 134, thereby also verifying that the technician has the proper permissions to modify the DNS entry 120. For example, the DNS server computer 108 may transmit an acknowledgement message indicating that the technician has been successfully verified.

After the DNS server computer 108 has verified the technician, the technician may perform a delete operation and an update operation through the "nsupdate" command on the DNS entry 120. As previously described, the DNS entry 120 may map the domain name to the first IP address, which corresponds to the first server computer 104. The technician may delete the first IP address from the DNS entry 120. Upon deleting the first IP address, the technician may then add the second IP address, which corresponds to the second server computer 106, to the DNS entry. As a result, the updated DNS entry 120 may now map the domain name to the second IP address instead of the first IP address.

When the end user now enters the domain name into the data access application 118 and the data access application 118 retrieves an IP address associated with the domain name from the DNS entry 120, the data access application 118 may retrieve the second IP address from the DNS entry 120. Upon retrieving the second IP address from the DNS entry 120, the data access application 118 may direct the user to the second server computer 106 via the second IP address. In some embodiments, the second server computer 106 may also include a health monitoring module 128B that monitors the health of the second server computer 106. The remote monitoring module 126 may receive monitoring data about the second server computer 106 from the health monitoring module 128B and further update the DNS entry 120 if the second server computer 106 fails as indicated by the monitoring data.

Figure 2:
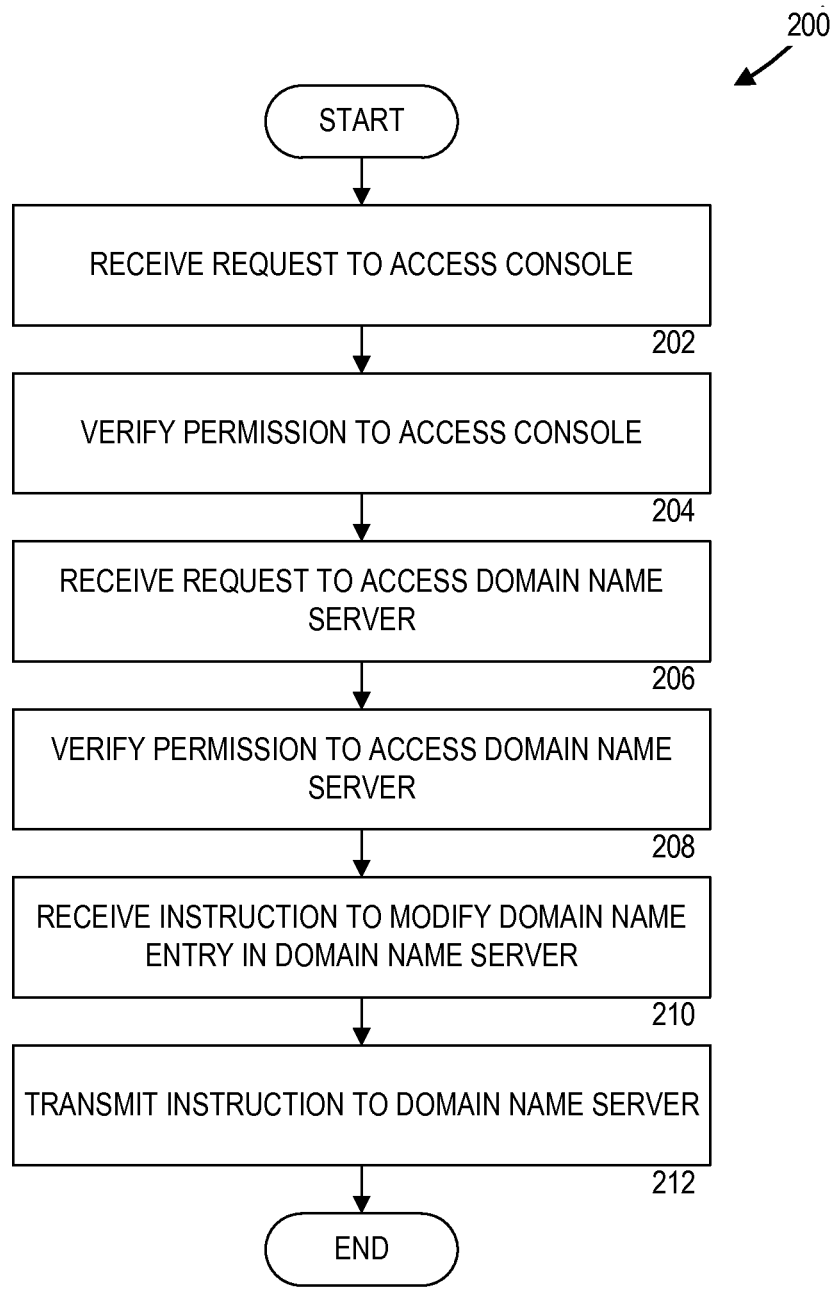
FIG. 2 is a flow diagram illustrating an example method for dynamically updating a domain name server, in accordance with some embodiments.

Referring to FIG. 2, additional details will be provided regarding the operation of the DNS access module 132. In particular, FIG. 2 is a flow diagram illustrating an example method 200 for updating a DNS server computer, such as the DNS server computer 108, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein. As used herein, the term "upon" may refer to a point in time. For example, "upon an occurrence" may refer to a point in time when the occurrence happens.

The method 200 begins at operation 202, where the DNS access module 132 may receive a request to access the DDNS server console 130. For example, a user may utilize the monitoring computer 124 to access, via telnet, the DDNS server console 130. The method 200 may then proceed to operation 204, where the DNS access module 132 may verify that the user has permission to access the DDNS server console 130. In some embodiments, the DNS access module 132 may request a username and a password from the user. Upon receiving the username and the password from the user, the DNS access module 132 may verify whether the user has permission to access the DDNS server console 130 based on the username and the password. If the DNS access module 132 verifies that the user has permission to access the DDNS server console 130, then the DNS access module 132 may grant access to the DDNS server console 130. If the DNS access module 132 verifies that the user does not have permission to access the DDNS server console 130, then the DNS access module 132 may deny access to the DDNS server console 130. When the DNS access module 132 verifies that the user has permission to access the DDNS server console 130, the method 200 may proceed to operation 206.

At operation 206, the DNS access module 132 may receive a request to access the DNS server computer 108. For example, after the user has been granted access to the DDNS server console 130, the user may initiate an "nsupdate" command in order to modify a DNS entry, such as the DNS entry 120. The method 200 may then proceed to operation 208, where the DNS access module 132 may verify that the user has permission to access the DNS server computer 108. In particular, the DNS server computer 108 may request further verification as to whether the user has permission to perform the "nsupdate" command. For example, the DNS server computer 108 may require that the technician have a special level of access in order to modify the DNS entry 120.

In some embodiments, the DNS server computer 108 may verify that the technician has the proper permission via a public key cryptography authentication scheme. The DNS access module 132 may generate a signature, such as the signature 138, using the private key 136. The DNS access module 132 may then provide the signature 138 to the DNS server computer 108. The DNS server computer 108 may verify that the signature 138 is genuine using a corresponding public key, such as the public key 134, thereby also verifying that the user has the proper permissions to modify the DNS entry 120. For example, the DNS server computer 108 may transmit an acknowledgement message indicating that the user has been successfully verified. When the DNS access module 132 has verified that the user has permission to access the DNS server computer 108, the method 200 may proceed to operation 210.

At operation 210, the DNS access module 132 may receive one or more instructions to modify a domain name entry, such as the DNS entry 120, in the DNS server computer 108. In some embodiments, the user may enter at last two instructions, a first instruction and a second instruction, via the "nsupdate" command in order to modify the DNS entry 120. Prior to modification, the DNS entry 120 may map a domain name to a previous IP address. The first instruction may instruct the DNS access module 132 to delete the previous IP address in the DNS entry 120. The second instruction may instruct the DNS access module 132 to add a new IP address to the DNS entry 120. The method 200 may then proceed to operation 212, where the DNS access module 132 transmits the instructions to the DNS server computer 108. The DNS server computer 108 may implement the two instructions. As a result of the two instructions, the DNS entry 120 may now map the domain name to the new IP address instead of the previous IP address. After the DNS entry 120 has been modified, the method 200 may either repeat (e.g., periodically, continuously, or on demand as needed) or terminate.

Figure 3:
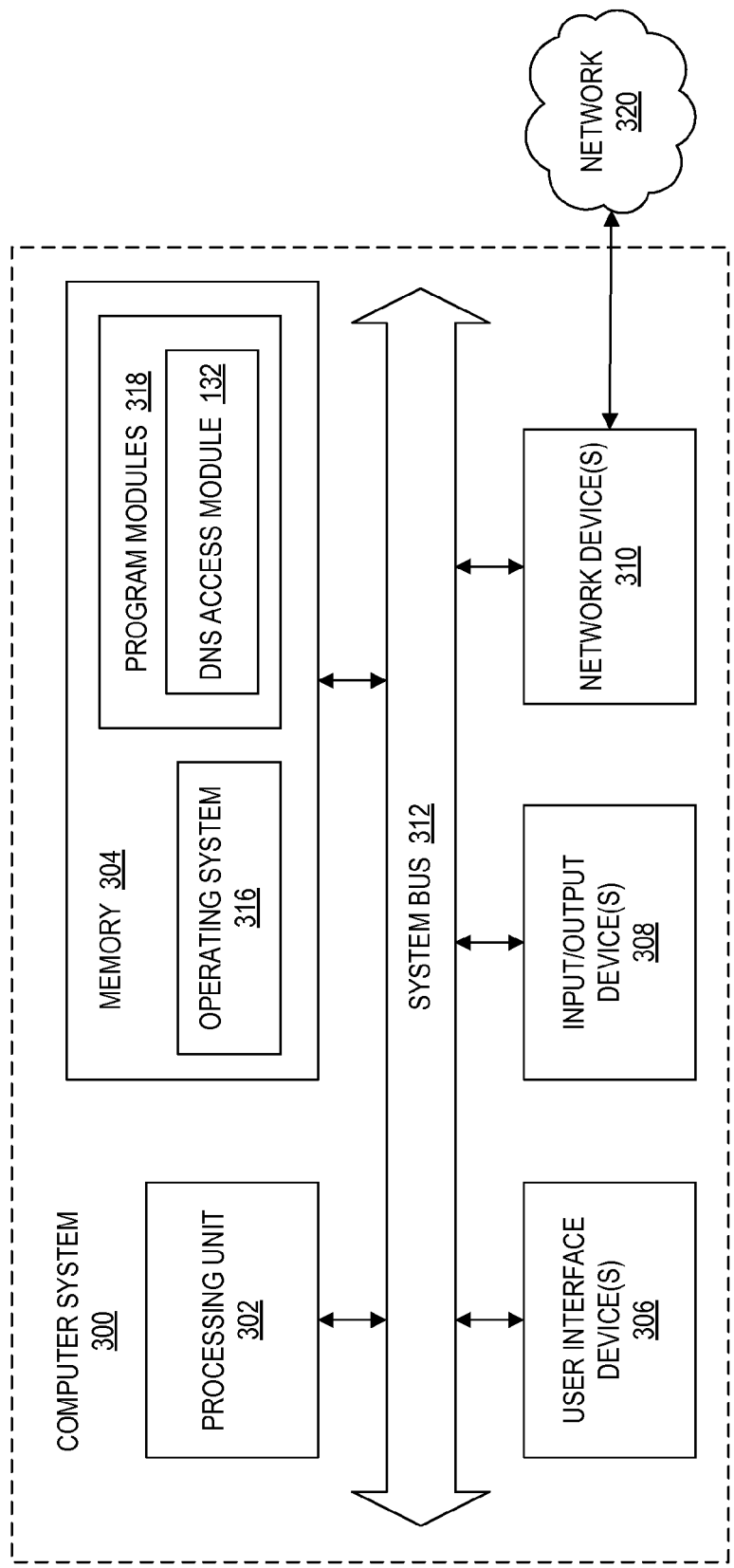
FIG. 3 is a block diagram illustrating an example computer system configured to update a domain name server, in accordance with some embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to update a DNS server computer, such as the DNS server computer 108, in accordance with embodiments. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes the operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, FREEBSD operating system, and SOLARIS operating system from ORACLE CORPORATION. The program modules 318 may include the DNS access module 132. In some embodiments, the DNS access module 132 embodied in computer-readable media containing instructions that, when executed by the processing unit 302, performs the method 200 for updating a DNS server computer, such as the DNS server computer 108, as described in greater detail above with respect to FIG. 2. According to embodiments, the program modules 318 may be embodied in hardware, software, firmware, or any combination thereof.

By way of example, and not limitation, computer-readable media may comprise non-transitory computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network, such as the network 320. Examples of the network devices 310 may include, but are not limited to, a modem, a radio frequency ("RF") or infrared ("IR") transceiver, a telephonic interface, a bridge, a router, or a network card. The network 320 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 320 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method comprising:

receiving, at a console comprising a processor, a request from a requester to access the console, the console coupled to a domain name server;

in response to receiving the request to access the console, verifying, by the console, that the requester has a first permission to access the console;

in response to verifying that the requester has the first permission to access the console, receiving, at the console from the requester, a command to modify an entry in the domain name server, the entry mapping a domain name to a first internet protocol address associated with a first remote server, the command comprising a first instruction to delete the first internet protocol address associated with the first remote server from the entry and a second instruction to add a second internet protocol address associated with a second remote server to the entry, the second remote server storing information that mirrors information stored by the first remote server;

receiving, by the console from the domain name server, verification that the requester has a second permission to modify the entry in the domain name server;

in response to receiving verification that the requester has the second permission to modify the entry in the domain name server, transmitting, by the console, the command from the console to the domain name server, the domain name server configured to delete the first internet protocol address associated with the first remote server from the entry and add the second internet protocol address associated with the second remote server to the entry such that the entry maps the domain name to the second internet protocol address associated with the second remote server to direct a request for access to the information via the domain name to the second remote server;

monitoring a health-related parameter of the first remote server, wherein the health-related parameter comprises a parameter selected from a group of parameters comprising a response time, a processor usage, a memory usage, a network usage, and another parameter;

determining that the health-related parameter indicates a disaster causing the first remote server to fail; and transmitting the command to modify the entry in the domain name server.

2. The method of claim 1, wherein verifying the first permission to access the console comprises:

receiving a username and a password associated with the requester; and upon receiving the username and the password, verifying that the requester has the first permission to access the console based on the username and the password.

3. The method of claim 1, wherein receiving, by the console from the domain name server, verification that the requester has the second permission to modify the entry in the domain name server comprises:

generating, at the console, a signature based on a private key stored at the console;

transmitting the signature from the console to the domain name server, the domain name server configured to verify the signature based on a public key; and after the signature is verified, receiving, at the console from the domain name server, an acknowledgement message indicating that the requester has the second permission to modify the entry in the domain name server.

4. The method of claim 1, wherein the request from the requester is received in response to a failure associated with the first remote server, and wherein the second remote server is inaccessible for accessing the information until the failure associated with the first remote server.

5. The method of claim 1, wherein the console comprises a server computer.

6. The method of claim 1, wherein the command comprises an nsupdate command.

7. A console comprising:

a processor; and a memory that stores instructions that, when executed by the processor, cause the processor to perform operations comprising receiving a request from a requester to access the console, in response to receiving the request to access the console, verifying that the requester has a first permission to access the console, in response to verifying that the requester has the first permission to access the console, receiving, from the requester, a command to modify an entry in a domain name server coupled to the console, the entry mapping a domain name to a first internet protocol address associated with a first remote server, the command comprising a first instruction to delete the first internet protocol address associated with the first remote server from the entry and a second instruction to add a second internet protocol address associated with a second remote server to the entry, the second remote server storing information that mirrors information stored by the first remote server, receiving, from the domain name server, verification that the requester has a second permission to modify the entry in the domain name server, in response to receiving verification that the requester has the second permission to modify the entry in the domain name server, transmitting the command to the domain name server, the domain name server configured to delete the first internet protocol address associated with the first remote server from the entry and add the second internet protocol address associated with the second remote server to the entry such that the entry maps the domain name to the second internet protocol address associated with the second remote server to direct a request for access to the information via the domain name to the second remote server, monitoring a health-related parameter of the first remote server, wherein the health-related parameter comprises a parameter selected from a group of parameters comprising a response time, a processor usage, a memory usage, a network usage, and another parameter, determining that the health-related parameter indicates a disaster causing the first remote server to fail, and transmitting the command to modify the entry in the domain name server.

8. The console of claim 7, wherein verifying the first permission to access the console comprises:

receiving a username and a password associated with the requester; and upon receiving the username and the password, verifying that the requester has the first permission to access the console based on the username and the password.

9. The console of claim 7, wherein receiving, from the domain name server, verification that the requester has the second permission to modify the entry in the domain name server comprises:

generating a signature based on a private key stored at the console;

transmitting the signature to the domain name server, the domain name server configured to verify the signature based on a public key; and after transmitting the signature to the domain name server, receiving, from the domain name server, an acknowledgement message indicating that the requester has the second permission to modify the entry in the domain name server.

10. The console of claim 7, wherein the request from the requester is received in response to a failure associated with the first remote server, and wherein the second remote server is inaccessible for accessing the information until the failure associated with the first remote server.

11. The console of claim 7, wherein the command comprises an nsupdate command.

12. A non-transitory computer-readable medium storing instructions that, when executed by a processor of a console, cause the processor to perform operations comprising:

receiving a request from a requester to access the console, the console coupled to a domain name server;

in response to receiving the request to access the console, verifying that the requester has a first permission to access the console;

in response to verifying that the requester has the first permission to access the console, receiving, from the requester, a command to modify an entry in the domain name server, the entry mapping a domain name to a first internet protocol address associated with a first remote server, the command comprising a first instruction to delete the first internet protocol address associated with the first remote server from the entry and a second instruction to add a second internet protocol address associated with a second remote server to the entry, the second remote server storing information that mirrors information stored by the first remote server;

receiving, from the domain name server, verification that the requester has a second permission to modify the entry in the domain name server;

in response to receiving verification that the requester has the second permission to modify the entry in the domain name server, transmitting the command to the domain name server, the domain name server configured to delete the first internet protocol address associated with the first remote server from the entry and add the second internet protocol address associated with the second remote server to the entry such that the entry maps the domain name to the second internet protocol address associated with the second remote server to direct a request for access to the information via the domain name to the second remote server;

monitoring a health-related parameter of the first remote server, wherein the health-related parameter comprises a parameter selected from a group of parameters comprising a response time, a processor usage, a memory usage, a network usage, and another parameter;

determining that the health-related parameter indicates a disaster causing the first remote server to fail; and transmitting the command to modify the entry in the domain name server.

13. The non-transitory computer-readable medium of claim 12, wherein verifying the first permission to access the console comprises:

receiving a username and a password associated with the requester; and upon receiving the username and the password, verifying that the requester has the first permission to access the console based on the username and the password.

14. The non-transitory computer-readable medium of claim 12, wherein receiving, from the domain name server, verification that the requester has the second permission to modify the entry in the domain name server comprises:

generating a signature based on a private key stored at the console;

transmitting the signature to the domain name server, the domain name server configured to verify the signature based on a public key; and after the signature is verified, receiving, from the domain name server, an acknowledgement message indicating that the requester has the second permission to modify the entry in the domain name server.

15. The non-transitory computer-readable medium of claim 12, wherein the request from the requester is received in response to a failure associated with the first remote server, and wherein the second remote server is inaccessible for accessing the information until the failure associated with the first remote server.

16. The non-transitory computer-readable medium of claim 12, wherein the console comprises a server computer.

17. The non-transitory computer-readable medium of claim 12, wherein the command comprises an nsupdate command.

* * * * *